United States Patent [19]
Sandre et al.

[11] Patent Number: 5,933,779
[45] Date of Patent: Aug. 3, 1999

[54] PROTOCOL FOR EXCHANGING SIGNALING SIGNALS IN A CORDLESS TELEPHONE

[75] Inventors: Benoît Sandre; Patrick Touzeau, both of Le Mans, France

[73] Assignee: U.S. Philips Corporation, New York, N.Y.

[21] Appl. No.: 08/728,114

[22] Filed: Oct. 9, 1996

[30] Foreign Application Priority Data

Oct. 11, 1995 [FR] France ................................ 95 11936

[51] Int. Cl.⁶ .............................. H04Q 7/14; H04B 7/12
[52] U.S. Cl. ........................ 455/513; 455/515; 455/516
[58] Field of Search ............................ 455/62, 450, 455, 455/452, 513, 515, 516

[56] References Cited

U.S. PATENT DOCUMENTS

| 5,101,503 | 3/1992 | Furuya ........................... 455/516 |
| 5,203,012 | 4/1993 | Patsiokas et al. ................ 455/513 |
| 5,408,684 | 4/1995 | Yunoki et al. .................. 455/455 |
| 5,551,064 | 8/1996 | Nobbe et al. .................... 455/513 |
| 5,566,366 | 10/1996 | Russo et al. ................... 455/513 |
| 5,655,002 | 8/1997 | Proctor et al. .................. 455/513 |
| 5,805,982 | 9/1998 | Hulsebosch ..................... 455/513 |

FOREIGN PATENT DOCUMENTS

| 0200209A2 | 11/1986 | European Pat. Off. . |
| 0522885A2 | 1/1993 | European Pat. Off. . |
| WO9424832 | 10/1994 | WIPO . |

Primary Examiner—Willis R. Wolfe
Attorney, Agent, or Firm—Dicran Halajian

[57] ABSTRACT

A channel is selected first, and immediately the received field is measured and digital Manchester code data are searched for. The digital signals are 100% Manchester code signals. After a predetermined first delay, the carrier level is tested and recorded in a memory. The smallest value among the various recorded values is selected; a fixed value is added thereto; and the value thus obtained is used as a threshold value for the level test. If the channel is free, another channel is selected. If the channel is occupied, one will wait for a second delay period, after which a test is performed to know whether data have been recognized. If nothing has been recognized, another channel is selected.

14 Claims, 1 Drawing Sheet

PROTOCOL FOR EXCHANGING SIGNALING SIGNALS IN A CORDLESS TELEPHONE

FIELD OF THE INVENTION

The present invention relates to a transmission protocol for digital signaling signals in a cordless telephone set, comprising a part called base station and a part called mobile station; the base station and the mobile station comprising each a transceiving circuit for transmitting or receiving said digital signals by radio link, via a modulated carrier for which carrier various channels are provided whose frequencies differ; in which protocol the base station and the mobile station, when no communication is sent, periodically proceed to a test called scanning test for determining whether a radio signal is transmitted, in which test the receiving circuit is first positioned on a channel and then, after a predetermined delay called first delay, the presence of a transmission is tested by comparing a received field measurement value with a predetermined threshold and, if there is no transmission, the receiving circuit is positioned on a next channel.

The invention likewise relates to a telephone system comprising a part called base station and a part called mobile station, the base station and the mobile station comprising both a transmission circuit for transmitting or receiving digital signals by radio link via a modulated carrier, for which carrier various channels are provided whose frequencies differ, the base station and the mobile station comprising each means for positioning the receiving circuit on a channel, means for testing at the end of a predetermined delay called first delay whether there is a transmission by verifying whether the value of the received field exceeds a predetermined threshold and, if there is no transmission, for positioning the receiving circuit on a next channel.

BACKGROUND OF THE INVENTION

A telephone in which a scanning of this type is performed is known from EP 0 522 885.

The mobile station is supplied with power by a rechargeable battery and its autonomy i.e. the time during which it can remain separated from the base station, depends on the size of the battery and on the power consumption of the circuits of the mobile station not only in the operation mode, but also in the standby mode. When the user wishes to use the telephone line and touches a key for this purpose, or when a call arrives on the line, a "link set-up request" is transmitted and repeated for setting up a radio connection called link between the base station and the mobile station; the link is not set up immediately, but only when a scanning has detected this request for setting up the link. The more the scanning takes place, the more the response time is reduced, but the more significant is the power consumption in the standby mode.

Various channels are defined and, depending on the circumstances, one wishes to be able to select a different channel. There are, for example, 10 channels. Before any use, a scanning is thus to be performed to select a channel which will cause a delay. The scanning is one of the critical points which determine the quality of a cordless telephone, because the response time depends thereon and also the autonomy of the mobile station, or the size of the battery, and the reliability of the set-up of the radio link.

SUMMARY OF THE INVENTION

It is an object of the invention to improve the selection criterions of a channel in a brief scanning period.

According to the invention, the value of the field is read for each of the successively used channels during the scanning, the smallest of these values is finally selected, a fixed value is added thereto and the value thus obtained is taken as the value of said predetermined threshold.

Such a dynamic determination (that is to say, susceptible to change in the course of its use) of the threshold value makes it possible to adapt the value of the threshold for example as a function of the noise level received via the aerial, and thus to have optimum operation because it is adapted to each environment.

Preferably, the digital signals are all coded in the same manner, during a scanning meant for searching whether another party wishes to set up a link, a decoder for decoding said digital signals is put into operation from the start of the scanning onwards, and when a transmission is considered received after the first delay, the decoder is left in operation after which, at the end of a predetermined delay called second delay, there is verified whether the decoder has properly recognized the code of the received signal, and if the decoder has properly recognized the code, it is permitted to continue decoding, if the decoder has not recognized the code, the receiving circuit is positioned on a next channel for applying the same process there.

The fact that the search is based on the simple detection of a type of code and not on the search for a predetermined message allows of a reduction of the time passed on a seized channel, because, as a complete link set-up request frame is encoded in the same code, it is possible at whatever moment to detect whether such a frame is being transmitted.

Advantageously, all the digital signaling signals are coded in the Manchester code, and a bit of a digital signaling signal is considered recognized if a transition is detected at a planned instant, indicated by a clock.

Such a code is easy to recognize.

The code of the received signal is considered to be recognized by the decoder if a predetermined number of consecutive bits have decoded without an error.

In a telephone system, a processor in the base station and a processor in the mobile station comprise each a program for reading the various field values which are measured for each of the channels, and for determining a threshold by adding a fixed value to the smallest field value thus read.

Preferably, each of the processors, that of the base station as well as that of the mobile station, comprises means for putting in operation from the start of the scanning operation a decoder for decoding said digital signals in order to try and decode any received digital signal, means for letting the decoder operate during again a predetermined delay called second delay when a transmission is considered received at the end of the first delay, and means for verifying at the end of the second delay whether the decoder has recognized the code of the received signal and in that case permitting the decoder to operate or, if the decoder has not recognized the code of the received signal, positioning the receiving circuit on a next channel.

These and other aspects of the invention will be apparent from and elucidated with reference to the embodiments described hereinafter.

DETAILED DESCRIPTION OF THE INVENTION

Figures 1A, 1B:
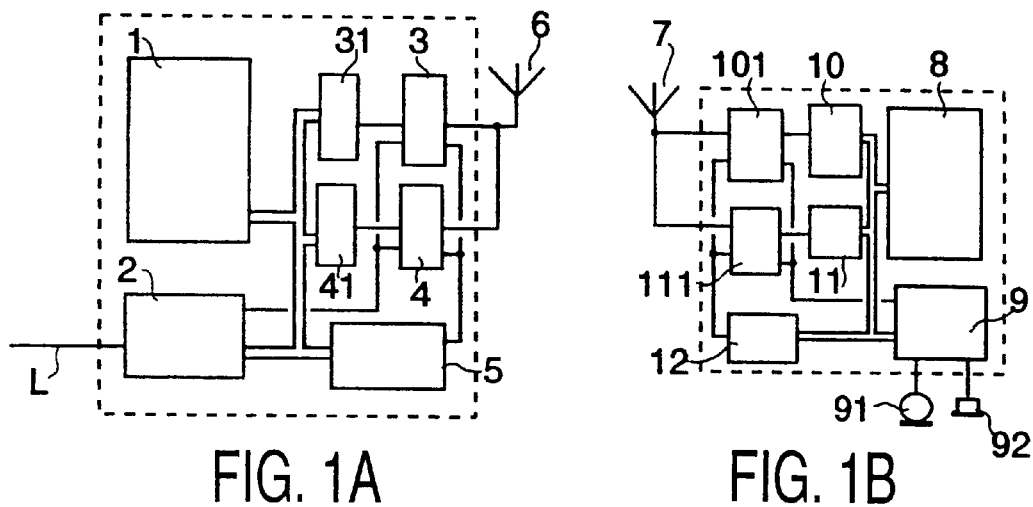
FIG. 1 represents the diagram of a telephone system in which the invention is applied.

The telephone set represented in FIG. 1 comprises two elements: in A a base station and in B a mobile station.

The base station comprises an interface module 2 with a telephone line L, which module is known per se, which is connected for communication with the mobile station to a radio transmission module 3 and a radio receiving module 4, both connected to an aerial 6. A decoder 41 is connected to the radio receiving module 4 for decoding digital data. A coder 31 is connected to the radio transmission module 3 for coding digital data. To permit the selection of a channel frequency upon request, the base station comprises a known frequency synthesizer 5 with a phase measuring loop for controlling the frequency, called PLL circuit. The base station further comprises a microprocessor 1 to manage various functions, amongst other things, to manage a scanning process. This microprocessor 1 is connected by a bus to at least modules 2, 5, 31, 41 of the base station to control them or receive information from them.

The mobile station comprises a microphone 91 and a loudspeaker 92 for transmitting acoustic signals, connected to an audio processing module 9 which is known per se. For the radio communication with a base station, the mobile station comprises a radio transmission module 101 and a radio receiving module 111 which are both connected to an aerial 7. A decoder 11 is connected to the radio receiving module 111 to decode digital data. An encoder 10 is connected to the radio transmission module 101 to encode digital data. To permit the selection of a channel frequency upon request, the mobile station also comprises a frequency synthesizer 12 known per se, with a phase measuring loop for controlling the frequency, called PLL circuit. It further includes a microprocessor 8 to manage various functions, amongst other things, to manage a scanning process. This microprocessor 8 is connected by a bus to at least the modules 9, 10, 11, 12 of the mobile station to control them or receive information from them.

Digital signals are used for managing the communication between the mobile station and the base station; these signals are formed by packets also called frames of fixed lengths. A frame lasts about 90 ms. A particular frame, called link set-up request frame, includes, for example, an identification code of the mobile station and a link set-up request code. Such a request is likely to be transmitted both by the mobile station and by the base station. The frames are coded over their entire length in the code known as Manchester code. As a reminder, this is a code in which a 1 bit or a 0 bit is represented respectively by an upward or downward transition. Such a transition takes place at an instant imposed by a clock. Obviously, if two identical bits occur in succession, there will be an interbit edge between them outside an imposed instant. The rate depends on the clock and on the microprocessor used; for example, with a 6805 microprocessor operating at 4.9152 MHz, the data rate is 833 bits/second.

Various situations are possible, that is:

1) before any request for setting up a link, the station that desires to set up a communication is to look for a free channel to avoid interference on another cordless telephone, or being interfered thereby. In this case the type of scanning used consists of successively scanning the channels to find a free channel. For this purpose, the level of the carrier is measured. A channel is called occupied, if the carrier level is higher than a predetermined threshold value, and free in the opposite case. It will be clear that the moment a free channel is found, the requesting station will be able to commence transmitting.

2) in the standby mode, one station periodically searches to detect whether the other station wishes to set up a link to the one station. This is called a scanning, a detection of a request for a link set-up. During the requests for a link set-up, frames are continuously transmitted by the requesting station (base station or mobile station) and the Manchester code stream is uninterrupted. For a station a scanning consists of scanning the channels to find such a request for the link set-up transmitted by the other station by one of these channels. In the case of the base station, or a mobile station resting on the base station, such scannings take place continuously. On the other hand, in the case where a mobile station is remote from its base station, they are separated by standby periods to enhance the autonomy of the mobile station at the cost of the response time. A scanning on the side of the mobile station in the standby mode takes place, for example, every second.

3) in the communication mode there is to be tested whether the range boundary has been reached. This will also be effected by comparing the level of the carrier with a threshold.

The decision thresholds may be different in above three situations. In a general manner, the higher they are the less the telephone set is sensitive to external interference, but the smaller the range will be.

For measuring the level of the carrier, a signal rectified in the circuit 4 or 111 is received by an analog/digital converter (base station) or (mobile station), to produce a digital value which can be used by the processor 1 or 8. By means of software the processor compares the value of the received field, that is to say, of the demodulated carrier level converted to a digital value, with a predetermined threshold value which is stored in a memory. For each channel the converted value is stored in addition.

Each time a scanning period ends, the processor tests the various values of the received field which are stored, and the smallest value called N_BAS is selected. A new threshold TH_D intended to determine whether a channel is free or occupied, is obtained by adding a constant CT to this value:

$$TH\_D = N\_BAS + CT$$

This threshold will be used during the next scanning sequence to determine whether the channel is free or occupied.

Of course, most of the time there are inactive channels and the smallest received value thus corresponds to noise.

The detection of the Manchester code is solely used in the situation 2) above.

Part of the software of one or the other of the microprocessors which ensures a part of a process will be called a routine.

Figure 2:
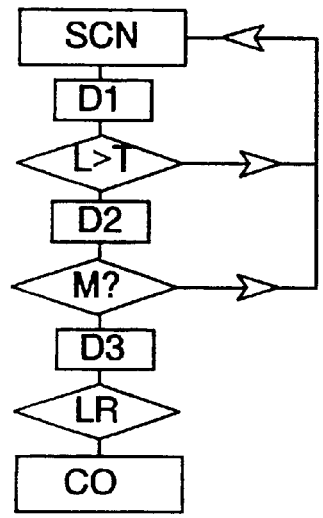
FIG. 2 is a flow chart of the scanning process.

A scanning for detecting a request for a link set-up, which may be performed both by the base station and the mobile station, is illustrated in FIG. 2 and comprises the following steps:

let N be the number of a channel. A routine SCN instructs the positioning of the circuit PLL on the channel N and switches the data detection into operation: the moment an instruction positioning the circuit PLL on the desired channel has been sent, the data decoding routine is initialized, even before the circuit PLL is interfered and before the carrier level is stabilized.

after a delay D1 of, for example, 20 ms, the carrier level is measured and a test is made whether the channel is free or occupied. The outcome of the test, which test is denoted L>T, is that if the channel is free, the process returns to the SCN routine to change to the next channel, and if the channel is occupied, the processor still waits during a delay D2 of, for example, 20 ms, after this delay, that is to say, after 40 ms after the start, the processor proceeds to the test denoted M? to know whether data have been detected. During the time D1, when data are detected correctly, this fact is recorded by the microprocessor. Data are considered to be detected correctly once the decoder has recognized a predetermined number of consecutive bits, for example, 16 bits. A bit is considered to be recognized if a transition is detected at one of the expected instants, indicated by a clock. A device in this respect may easily be made by a person of ordinary skill in the art, for example, a device that samples the signal before and after the respective instant and by verifying whether the signal has changed between the two samples. If no data have been detected, the processor goes back to the SCN routine to change to the next channel. If there has been a data detection, the processor will wait during a new delay period D3 and then proceed to a test denoted LR to know whether a complete link set-up request frame has been obtained, with an identification code of the right mobile station. In that case, the communication CO between base station and mobile station is commenced.

Figure 3:
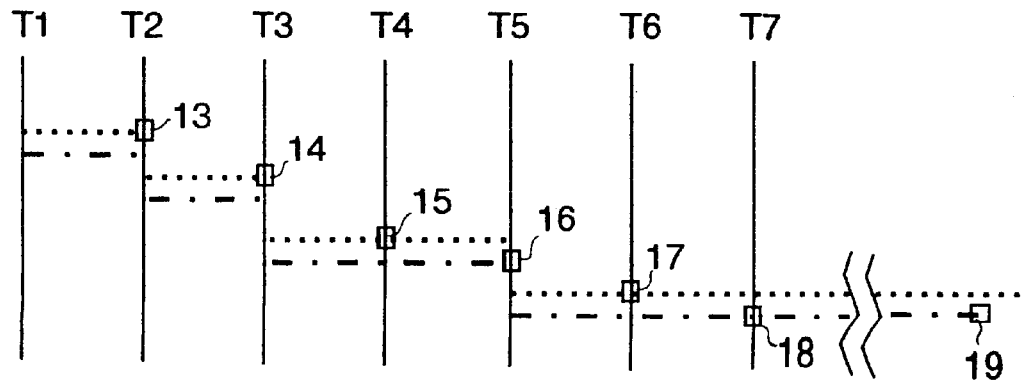
FIG. 3 is a timing diagram of an example of the scanning sequence.

An example of a scanning sequence for detecting a request for a set-up of a link is illustrated by FIG. 3. At instant T1, the circuit PLL is positioned on a channel, which is illustrated by a dotted line, and the data detection circuit is switched into operation, which is illustrated by a dash-and-dot line. At the instant T2, at 13, the presence of a carrier is tested. It is supposed that in the present case there is no carrier (thus no request for a link set-up on this channel); then the next channel is selected, which is illustrated by two lines placed lower, lower than T2. At instant T3, at 14, the presence of a carrier is again tested; it is supposed that in the present case there is not always a carrier. Thus, the next channel is selected, which is illustrated by two lines placed still lower, after T3. At the instant T4, at 15, it is supposed that a carrier is detected; the frequency is thus not changed (the two lines continue to be at the same height). At the instant T5, at 16, the data decoding is tested. It is supposed that in the present case no decoding has been successful; thus the next channel is selected, which is illustrated by the two lines being placed lower after instant T5. At instant T6 it is supposed that the operation 17 finds that there is a carrier, the frequency is thus not changed (the two lines continue to be at the same height). At instant T7, at 18, the data decoding is tested. It is supposed that Manchester data have been recognized; thus the frequency does not change (dotted line) and the data detection is proceeded with (dash-and-dot line). At 19 it is found that a complete frame for a link set-up request has been received.

Each time, the period between T1 and T2, T2 and T3, etc. is 20 ms. Thus the time passed on this channel is 20 ms in the case of a free channel, or 40 ms in the case of an occupied channel without Manchester coded data. For ten channels in the most frequently occurring case where no channel is occupied, the scanning lasts 10×20 ms, that is to say, only 200 ms. As a reminder, if a complete frame is waited for to make a decision, the time passed in the case of an occupied channel would be 110 ms (90+20 ms) for each channel. Thanks to a much shorter scanning time, it is possible either to increase the number of channels, or reduce the total scanning time, that is to say, reduce the energy consumption and thus enhance the autonomy of the mobile station in the standby mode. Of course, the periods of 20 ms indicated above are orders of magnitude; experience makes it possible to determine in a simple fashion for a predetermined apparatus, what the minimum time is necessary for obtaining reliable operation.

We claim:

1. A transmission protocol, comprising a base station and a mobile station; the base station and the mobile station each comprising a transceiving circuit having a transmitting circuit for transmitting transmitted signals and a receiving circuit for receiving received signals via a modulated carrier provided on channels of different frequencies; wherein the base station and the mobile station, when no communication is sent, periodically proceed to a scanning test for determining whether a signal is transmitted, said scanning test positioning the receiving circuit in first position on a current channel and, after a first delay, the presence of a transmission is tested by comparing a received field measurement value with a threshold and, if there is no transmission, the receiving circuit is positioned on a next channel, wherein the received field measurement value is read for each of successively used channels during the scanning, a smallest value of the received field measurement values is selected, a fixed value is added to the smallest value to obtain a new value and the new value is used as said threshold.

2. The protocol as claimed in claim 1, wherein a duration of the first delay is ten to thirty milliseconds.

3. The protocol as claimed in claim 1, wherein the transmitted signals and the received signals are coded in the same manner, during a scanning meant for searching whether another party wishes to set up a link, a decoder for decoding the received signals is operated from the start of the scanning, and when a transmission is considered received after the first delay, the decoder is left in operation after which, at the end of a second delay, there is verified whether the decoder has properly recognized the code of the received signals, and if the decoder has properly recognized the code, it is left to continue decoding, if the decoder has not recognized the code, the receiving circuit is positioned on a next channel for applying the same process.

4. The protocol as claimed in claim 3, wherein a duration of the second delay is ten to thirty milliseconds.

5. The protocol as claimed in claim 3, wherein the transmitted signals and the received signals are coded in a Manchester code, and a bit of each of the transmitted signals and the received signals is considered recognized if a transition is detected at a planned instant, indicated by a clock.

6. The protocol as claimed in claim 3, wherein the code of the received signals is considered to be recognized by the decoder if a predetermined number of consecutive bits have been recognized.

7. A telephone system comprising a base station and a mobile station, the base station and the mobile station comprising both a a transmitting circuit for transmitting transmitted signals and a receiving circuit for receiving received signals via a modulated carrier provided on channels of different frequencies, the base station and the mobile station each comprising means for positioning the receiving circuit on a current channel, means for testing at an end of a first delay whether there is a transmission by verifying whether a value of a received field exceeds a threshold and, if there is no transmission, for positioning the receiving circuit on a next channel, wherein a processor in the base station and a processor in the mobile station each comprises a program for reading various field values which are measured for each of the channels, and for determining the threshold by adding a fixed value to a smallest field value of the various field values.

8. The base station for the telephone system as claimed in claim 7, wherein said processor of said base station comprises a program for increasing the various field values which are measured for each of the channels to get a smallest value of the increased various field values, and for determining the threshold by adding the fixed value to the smallest value.

9. The mobile station for the telephone system as claimed in claim 7, wherein said processor of said mobile station comprises a program for increasing the various field values which are measured for each of the channels to get a smallest value of the increased various field values, and for determining the threshold by adding the fixed value to the smallest value.

10. The telephone system as claimed in claim 7, wherein the transmitted signals and the received signals are all coded in the same manner and each processor comprises means for putting in operation from a start of a scanning operation a decoder for decoding digital the received signals, means for letting the decoder operate during a second delay when a transmission is considered received at an end of the first delay, and means for verifying at an end of the second delay whether the decoder has recognized the code of the received signals and permitting the decoder to operate or, if the decoder has not recognized the code of the received signals, positioning the receiving circuit on the next channel.

11. The base station for the telephone system as claimed in claim 10, wherein the base station comprises means for detecting a transition in the received signals at a predetermined instant indicated by a clock, and for indicating to the processor of said base station that a bit of the received signals has been decoded.

12. The base station for the telephone system as claimed in claim 11, wherein said processor of said base station comprises a program for counting the number of consecutive decoded bits.

13. The mobile station for the telephone system as claimed in claim 10, further comprising means for detecting a transition in the received signals at a predetermined instant indicated by a clock, and for indicating to the processor of said mobile station that a bit of the received signals has been decoded.

14. The mobile station for the telephone system as claimed in claim 13, wherein said processor of said mobile station comprises a program for counting number of consecutive decoded bits.

* * * * *